(12) United States Patent
Yamaguchi et al.

(10) Patent No.: US 9,228,643 B2
(45) Date of Patent: Jan. 5, 2016

(54) CHAIN TENSIONING DEVICE

(71) Applicant: Shimano Inc., Sakai, Osaka (JP)

(72) Inventors: Sota Yamaguchi, Osaka (JP); Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 204 days.

(21) Appl. No.: 14/025,739

(22) Filed: Sep. 12, 2013

(65) Prior Publication Data

US 2015/0072817 A1 Mar. 12, 2015

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *F16H 7/10* | (2006.01) |
| *F16H 7/12* | (2006.01) |
| *F16H 7/08* | (2006.01) |

(52) U.S. Cl.
CPC ............... *F16H 7/10* (2013.01); *F16H 7/1227* (2013.01); *F16H 2007/081* (2013.01)

(58) Field of Classification Search
CPC ...... B62M 9/122; B62M 25/08; B62M 9/132; F16H 2007/0859; B62K 23/06
USPC ....................................... 474/80, 82
See application file for complete search history.

(56) References Cited

U.S. PATENT DOCUMENTS

| | | | | |
|---|---|---|---|---|
| 1,873,100 | A * | 8/1932 | Allen | 188/310 |
| 4,563,167 | A * | 1/1986 | Foster | 474/135 |
| 4,599,079 | A * | 7/1986 | Chappell | 474/80 |
| 4,850,940 | A * | 7/1989 | Nagano | 474/80 |
| 4,942,947 | A * | 7/1990 | Shtarkman | 188/267.2 |
| 5,655,982 | A * | 8/1997 | Fyfe | 474/80 |
| 5,890,979 | A * | 4/1999 | Wendler | 474/82 |
| 6,012,999 | A * | 1/2000 | Patterson | 474/80 |
| 6,042,495 | A * | 3/2000 | Patterson et al. | 474/80 |
| 6,135,904 | A * | 10/2000 | Guthrie | 474/82 |
| 6,293,881 | B1 * | 9/2001 | Ichida | 474/80 |
| 6,325,733 | B1 * | 12/2001 | Patterson et al. | 474/80 |
| 6,638,190 | B2 * | 10/2003 | Patterson et al. | 474/82 |
| 7,032,475 | B2 * | 4/2006 | Ichida et al. | 74/502.2 |
| 7,137,314 | B2 * | 11/2006 | Ichida et al. | 74/502.2 |
| 7,219,574 | B2 * | 5/2007 | Ichida et al. | 74/502.2 |
| 7,549,662 | B2 * | 6/2009 | Righi et al. | 280/257 |
| 8,870,692 | B2 * | 10/2014 | Yamaguchi et al. | 474/80 |
| 8,870,693 | B2 * | 10/2014 | Shahana et al. | 474/80 |
| 8,900,078 | B2 * | 12/2014 | Yamaguchi et al. | 474/80 |

(Continued)

FOREIGN PATENT DOCUMENTS

| | | |
|---|---|---|
| JP | 2-296024 A | 12/1990 |
| JP | 5-44761 A | 2/1993 |

(Continued)

*Primary Examiner* — Henry Liu
(74) *Attorney, Agent, or Firm* — Global IP Counselors

(57) ABSTRACT

A chain tensioning device is basically provided with a main body, a chain guide and a rotary fluid damper unit. The main body is configured to be mounted to a bicycle. The chain guide is pivotally coupled to the main body to rotate around a rotational axis with respect to the main body. The rotary fluid damper unit is operatively connected between the main body and the chain guide to provide rotational resistance to the chain guide around the rotational axis. The rotary fluid damper unit is a separate unit from the main body, the rotary fluid damper unit being detachably mounted on the main body.

16 Claims, 11 Drawing Sheets

(56) References Cited

U.S. PATENT DOCUMENTS

| | | |
|---|---|---|
| 2002/0058558 A1* | 5/2002 | Patterson et al. ............... 474/82 |
| 2002/0187867 A1* | 12/2002 | Ichida et al. .................... 474/82 |
| 2007/0173360 A1* | 7/2007 | Shahana et al. ................. 474/82 |
| 2007/0219029 A1* | 9/2007 | Turner ............................ 474/80 |
| 2009/0045601 A1* | 2/2009 | Colegrove et al. ............ 280/284 |
| 2011/0056782 A1* | 3/2011 | Gustafsson ................... 188/290 |

FOREIGN PATENT DOCUMENTS

| | | |
|---|---|---|
| JP | 11-82593 A | 3/1999 |
| JP | 2008-8418 A | 1/2008 |
| WO | 2007/106867 A2 | 9/2007 |

* cited by examiner

CHAIN TENSIONING DEVICE

BACKGROUND

1. Field of the Invention

This invention generally relates to a chain tensioning device. More specifically, the present invention relates to a chain tensioning device that is provided with a damper unit, which slows sudden movement of the chain guide in at least one direction.

2. Background Information

A bicycle typically uses a chain drive transmission for transmitting a pedaling force to a rear wheel. Many bicycles having a chain drive transmission either use an internally geared hub or a pair of derailleurs to selectively change speeds. In the case of an internally geared hub, a chain tensioning device (also called a chain tensioner) is used to keep the proper tension on the chain. In the case of a chain drive transmission using a pair of derailleurs, the rear derailleur is usually configured to provide the proper tension on the chain. Thus, the rear derailleur is a type of a chain tensioning device that is also used to shift the chain between rear sprockets. A typical rear derailleur has a base member, a movable member pivotally supporting a chain guide and a linkage assembly (e.g., a moving mechanism) coupled between the base member and the movable member so that the chain guide moves laterally relative to the base member. The rear derailleur typically has a biasing element that is provided between the movable member and the chain guide to bias the chain guide in a direction to take up slack in the chain.

In some cases, a chain tensioning device is provided with a damper to slow changes in chain tension. An example of a chain tensioning device that is provided with a damper is disclosed in International Patent Application Publication No. WO 2007/106897. The chain tensioning device disclosed in this international patent application publication is a rear derailleur in which the damper includes a one-way valve to slow changes in chain tension in one rotational direction of the chain guide more than the other rotational direction of the chain guide. Another example of a rear derailleur (i.e., a chain tensioning device) is disclosed in U.S. Pat. No. 6,135,904.

SUMMARY

Generally, the present disclosure discloses various features of a chain tensioning device for a bicycle. As mentioned above, a chain tensioning device (also called a chain tensioner) is used to keep the proper tension on a chain that is used in a bicycle chain drive transmission. In one feature, the chain tensioning device is provided that includes a main body, a chain guide pivotally coupled to the main body and a rotary fluid damper unit that provides rotational resistance to the chain guide around a rotational axis. Preferably, the rotary fluid damper unit is easily detachable and reinstallable to improve maintenance and assembly of the chain tensioning device.

In view of the state of the known technology and in accordance with a first aspect of the present disclosure, a chain tensioning device is provided that basically comprises a main body, a chain guide and a rotary fluid damper unit. The main body is configured to be mounted to a bicycle. The chain guide is pivotally coupled to the main body to rotate around a rotational axis with respect to the main body. The rotary fluid damper unit is operatively connected between the main body and the chain guide to provide rotational resistance to the chain guide around the rotational axis. The rotary fluid damper unit is a separate unit from the main body, the rotary fluid damper unit being detachably mounted on the main body.

In accordance with a second aspect, the chain tensioning device according to the first aspect is configured so that the rotary fluid damper unit is detachably attached to the main body while the chain tensioning device is mounted to the bicycle.

In accordance with a third aspect, the chain tensioning device according to the first aspect is configured so that the rotary fluid damper unit is detachably attached to the main body on a non-frame facing side of the main body by at least one fastener.

In accordance with a fourth aspect, the chain tensioning device according to the first aspect is configured so that the rotary fluid damper unit includes an outer member that is fixed to the main body and an inner member that is fixed to the chain guide, the inner member being rotatably disposed inside of the outer member to define a fluid cavity that is filled with a fluid.

In accordance with a fifth aspect, the chain tensioning device according to the fourth aspect is configured so that the inner member includes a portion that extends outside of the outer member in an axis direction of the rotational axis, and so that the chain guide is coupled to the portion of the inner member.

In accordance with a sixth aspect, the chain tensioning device according to the fifth aspect is configured so that the main body includes a portion that is disposed between the outer member and the chain guide with respect to the axis direction of the rotational axis.

In accordance with a seventh aspect, the chain tensioning device according to the fifth aspect is configured so that the main body includes an opening. The inner member extends through the opening of the main body.

In accordance with an eighth aspect, the chain tensioning device according to the first aspect is configured so that the rotary fluid damper unit includes at least one fluid bleed valve.

In accordance with a ninth aspect, the chain tensioning device according to the fourth aspect further comprises at least one fluid flow limiting valve configured to form a flow path between the fluid flow limiting valve and one of the outer member and the inner member.

In accordance with a tenth aspect, the chain tensioning device according to the ninth aspect is configured so that the at least one fluid flow limiting valve is configured to move radially as the inner member rotates relative to the outer member about the rotational axis.

In accordance with an eleventh aspect, the chain tensioning device according to the tenth aspect is configured so that the at least one fluid flow limiting valve includes a first slanted surface facing in a first circumferential direction and a second slanted surface facing in a second circumferential direction, which is opposite to the first circumferential direction with respect to the rotational axis, and so that the first slanted surface is arranged to be forced radially inward by the fluid in the cavity as the inner member rotates relative to the outer member about the rotational axis in a first rotational direction, and the second slanted surface is arranged to be forced radially outward by the fluid in the cavity as the inner member rotates relative to the outer member about the rotational axis in a second rotational direction, which is opposite to the first rotational direction.

In accordance with a twelfth aspect, the chain tensioning device according to the ninth aspect is configured so that the at least one fluid flow limiting valve includes a first fluid flow limiting valve that is configured to form a first flow path between the first fluid flow limiting valve and-the outer member, and a second fluid flow limiting valve that is configured to form a second flow path between the second fluid flow limiting valve and the inner member.

In accordance with a thirteenth aspect, the chain tensioning device according to the twelfth aspect is configured so that each of the first and second fluid flow limiting valves includes a first slanted surface facing in a first circumferential direction and a second slanted surface facing in a second circumferential direction, which is opposite to the first circumferential direction with respect to the rotational axis. The first slanted surface of the first fluid flow limiting valve is arranged to be forced radially inward by the fluid in the cavity as the inner member rotates relative to the outer member about the rotational axis in a first rotational direction. The second slanted surface of the first fluid flow limiting valve is arranged to be forced radially outward by the fluid in the cavity as the inner member rotates relative to the outer member about the rotational axis in a second rotational direction, which is opposite to the first rotational direction. The first slanted surface of the second fluid flow limiting valve is arranged to be forced radially inward by the fluid in the cavity as the inner member rotates relative to the outer member about the rotational axis in the second rotational direction. The second slanted surface of the second fluid flow limiting valve is arranged to be forced radially outward by the fluid in the cavity as the inner member rotates relative to the outer member about the rotational axis in the first rotational direction.

In accordance with a fourteenth aspect, the chain tensioning device according to the twelfth aspect further comprises a biasing element biasing the chain guide in a first rotational direction around the rotational axis with respect to the main body, and the rotary fluid damper unit provides a higher degree of rotational resistance in a second rotational direction, which is opposite to the first rotational direction In accordance with a fifteenth aspect, the chain tensioning device according to the first aspect is configured so that the chain guide includes at least one pulley.

In accordance with a sixteenth aspect, the chain tensioning device according to the first aspect is configured so that the main body includes a base member, a movable member and a moving structure operatively coupled between the base member and the movable member to move the movable member and the chain guide relative to the base member. The rotary fluid damper unit is disposed on the movable member.

Also other objects, features, aspects and advantages of the disclosed chain tensioning device will become apparent to those skilled in the art from the following detailed description, which, taken in conjunction with the annexed drawings, discloses embodiments of the chain tensioning devices.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
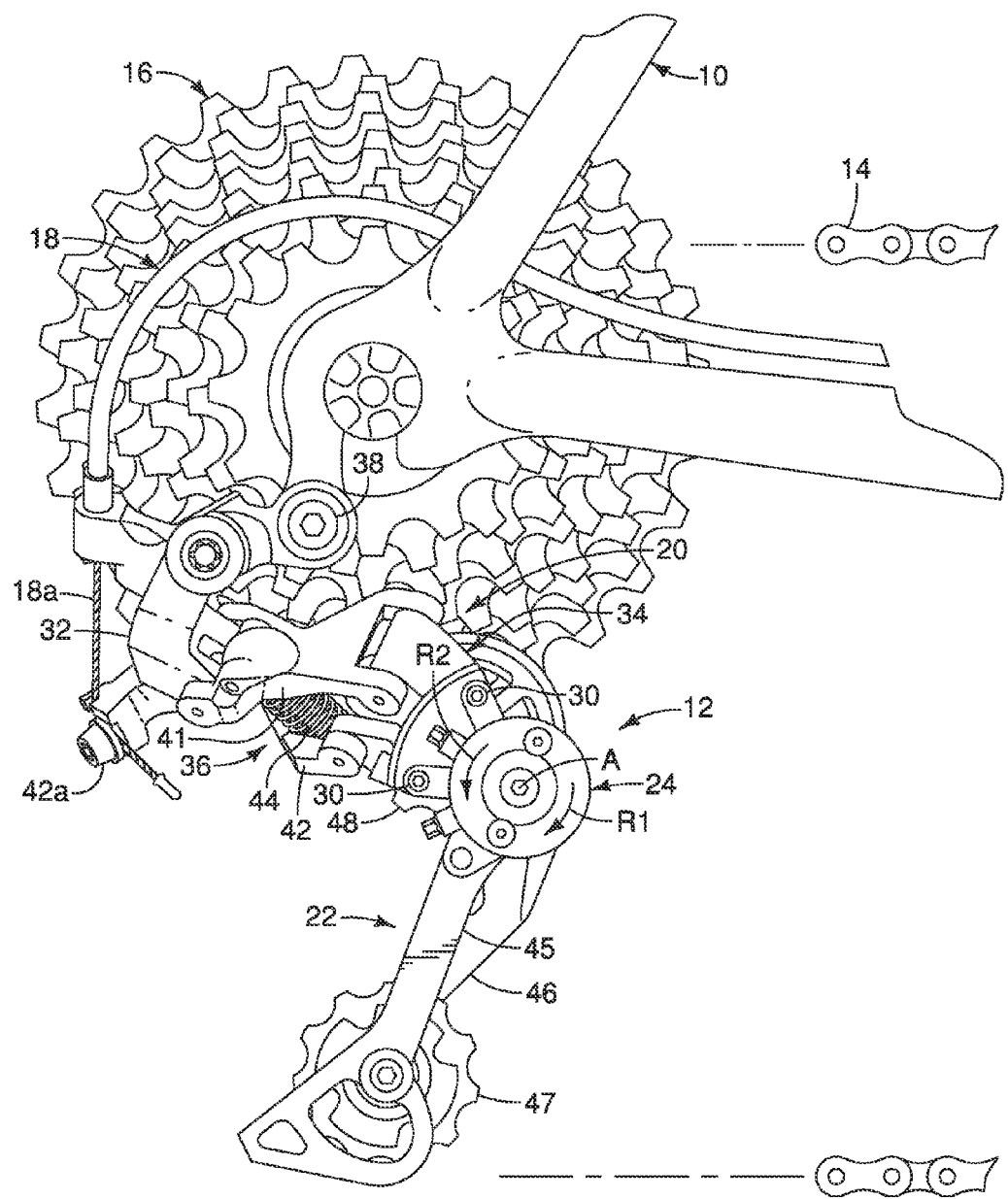
FIG. 1 is a partial side elevational view of a rear frame portion of a bicycle with a bicycle rear derailleur (i.e., a chain tensioning device) in accordance with one illustrated embodiment.

Referring initially to FIG. 1, a portion of a bicycle 10 is illustrated that includes a bicycle rear derailleur 12 (i.e., a chain tensioning device) in accordance with a first embodiment. The bicycle rear derailleur 12 is configured to shift a chain 14 between adjacent ones of a plurality of rear sprockets 16 in a conventional manner. In the first embodiment, the bicycle rear derailleur 12 is operated by a Bowden cable 18 in a conventional manner. However, the bicycle rear derailleur 12 is not limited to a cable operated derailleur. In other words, it will be apparent to those skilled in the bicycle field from this disclosure that the bicycle rear derailleur 12 can include an actuator such a motor, a pneumatic actuator, or the like for shifting the chain 14 between the rear sprockets 16.

The bicycle rear derailleur 12 (i.e., a chain tensioning device) basically comprises a main body 20, a chain guide 22 and a rotary fluid damper unit 24. The main body 20 is configured to be mounted to the bicycle 10 in a detachable and reinstallable manner. The chain guide 22 is pivotally coupled to the main body 20 to rotate around a rotational axis A with respect to the main body 20. The rotary fluid damper unit 24 is operatively connected between the main body 20 and the chain guide 22 to provide rotational resistance to the chain guide 22 around the rotational axis A. While the rotary fluid damper unit 24 is used in a rear derailleur, it will be apparent to those skilled in the bicycle field from this disclosure that the rotary fluid damper unit 24 can be used as merely a chain tensioning device (also called a chain tensioner) that is used with an internally geared hub or by itself. The rotary fluid damper unit 24 slows sudden movement of the chain guide in at least one direction. The rotary fluid damper unit 24 is a one-way rotary damper that provides different rotational resistance in different rotational directions.

Figure 2:
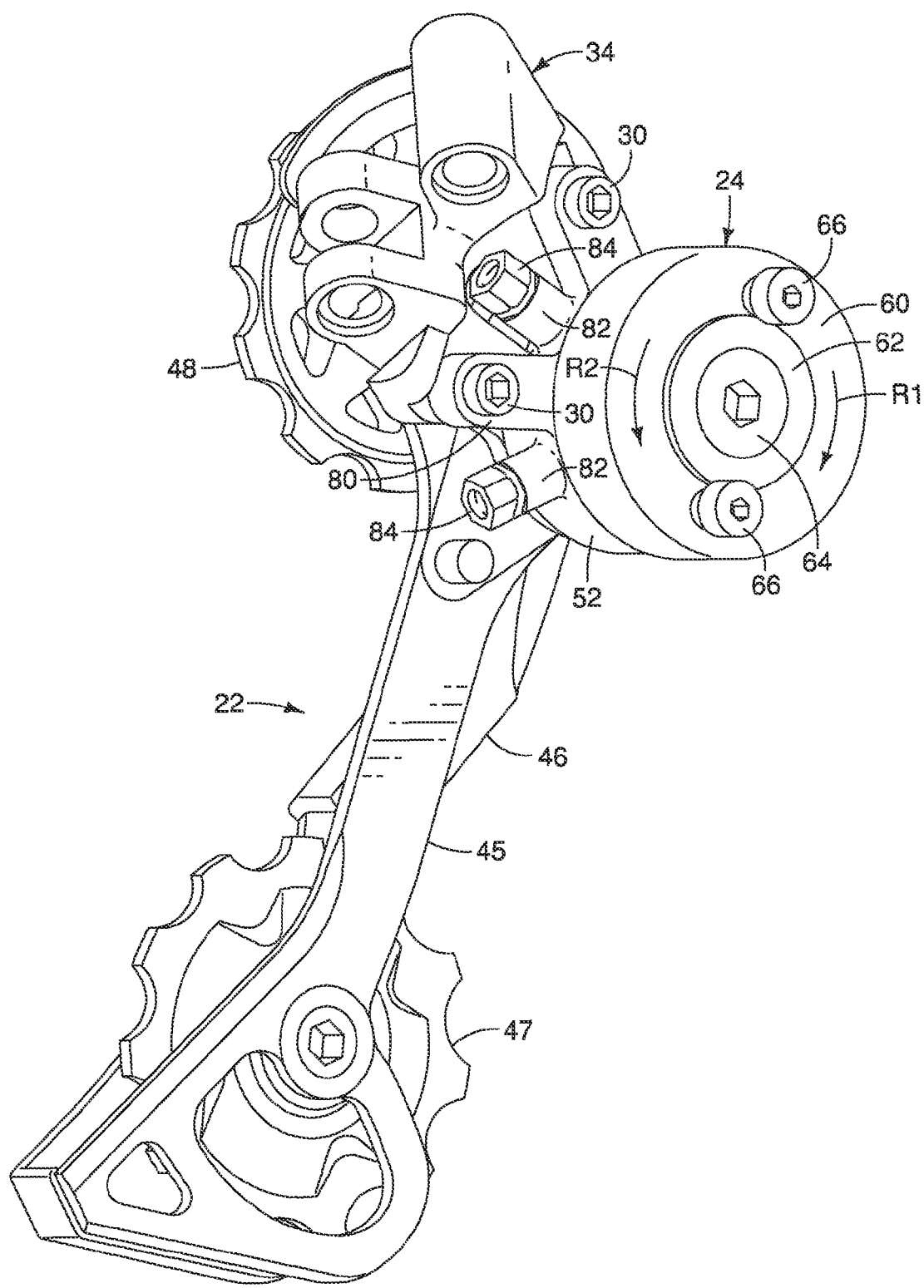
FIG. 2 is a perspective view of the movable member, the chain guide and the rotary fluid damper unit of the rear derailleur illustrated in FIG. 1 as viewed from the non-frame facing side of the rear derailleur.

As seen in FIGS. 1 and 2, the rotary fluid damper unit 24 is a separate unit from the main body 20. Thus, the phrase "separate unit" as used herein means that the rotary fluid damper unit 24 is a self-contained and completely independent structure that can operate without any structure of the main body 20 (e.g., the housing of the rotary fluid damper unit 24 is not formed by a part of the main body 20). The rotary fluid damper unit 24 is detachably mounted on the main body 20 such that the rotary fluid damper unit 24 can be detached from the main body 20 and reinstalled on the main body 20 without having to disassemble the main body 20 as explained later. Thus, the phrases "detachably mounted", "detachably attached" and the like as used herein means that the rotary fluid damper unit 24 is configured to be detached from the main body 20 and reinstalled on the main body 20 without having to disassemble the main body 20. The rotary fluid damper unit 24 is detachably attached to the main body 20 while the bicycle rear derailleur 12 (i.e., a chain tensioning device) is mounted to the bicycle 10. The rotary fluid damper unit 24 is detachably attached to the main body 20 on a non-frame facing side of the main body 20 by at least one fastener. Here, the rotary fluid damper unit 24 is detachably attached to the main body 20 by a pair of fasteners 30. The fasteners 30 are preferably threaded fasteners such as bolts.

In the first embodiment, as seen in FIG. 1, the main body 20 includes a base member 32, a movable member 34 and a moving structure 36. The moving structure 36 is operatively coupled between the base member 32 and the movable member 34 to move the movable member 34 and the chain guide 22 relative to the base member 32. The base member 32 defines a first end of the main body 20 that releasably mounted to the bicycle via a fixing bolt 38. The movable member 34 defines a second end of the main body 20 that pivotally supports the chain guide 22 to the main body 20.

As seen in FIGS. 1 and 2, the rotary fluid damper unit 24 is disposed on the movable member 34. In particular, as seen in FIGS. 3 to 6, the movable member 34 includes a damper support portion 34a that defines an opening 34b for receiving a portion of the rotary fluid damper unit 24 therethrough. Thus, the movable member 34 of the main body 20 includes the opening 34b for receiving a portion of the rotary fluid damper unit 24 therethrough. Here, the opening 34b of the movable member 34 is circular. However, it will be apparent to those skilled in the bicycle field from this disclosure that the opening 34b can be non-circular. The movable member 34 has a pair of threaded bores 34c for threadedly receiving the fasteners 30 to fixedly secure the rotary fluid damper unit 24 to the movable member 34.

Figure 3:
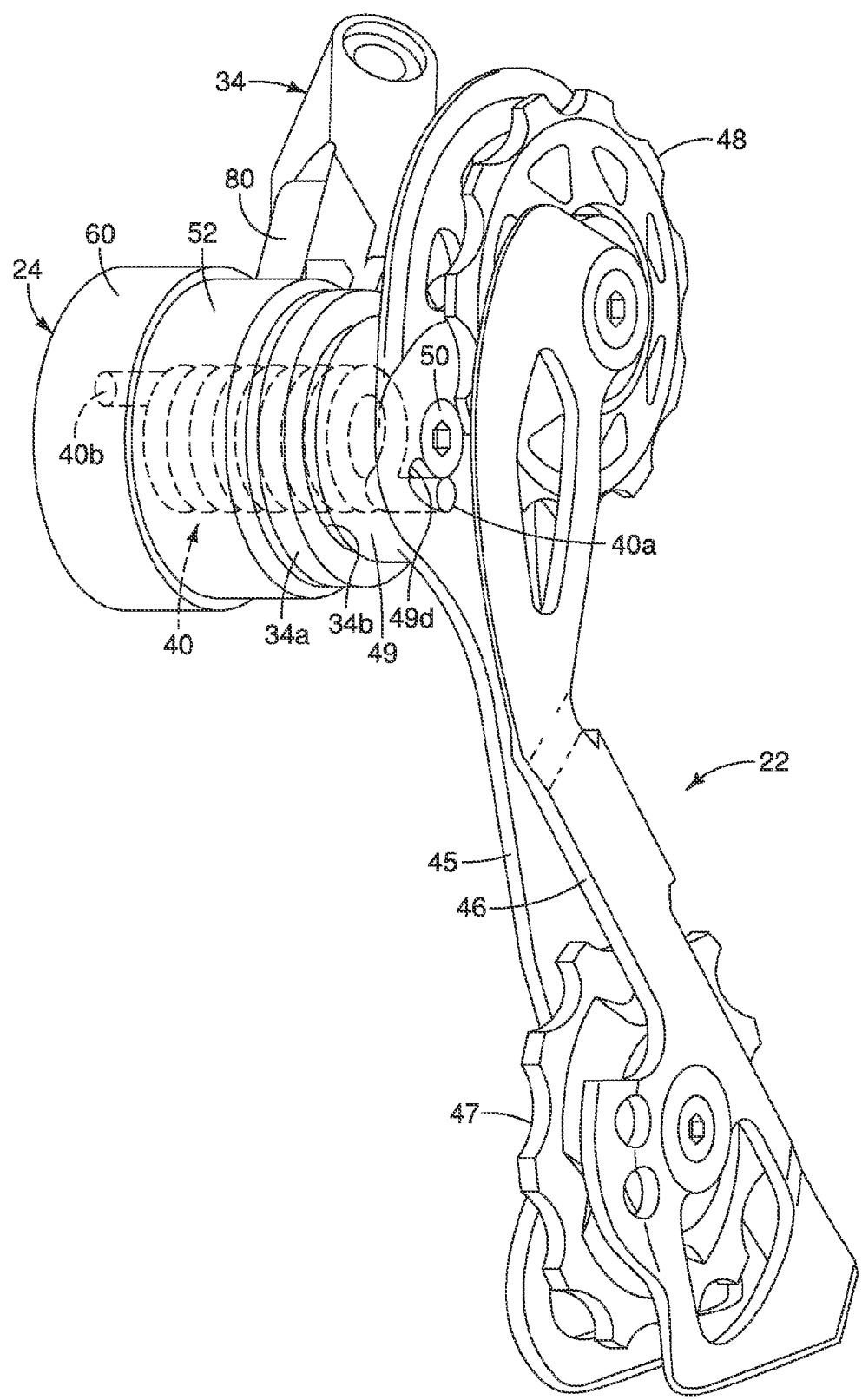
FIG. 3 is a perspective view of the movable member, the chain guide and the rotary fluid damper unit of the rear derailleur illustrated in FIGS. 1 and 2 as viewed from the frame facing side of the rear derailleur.
Figure 4:
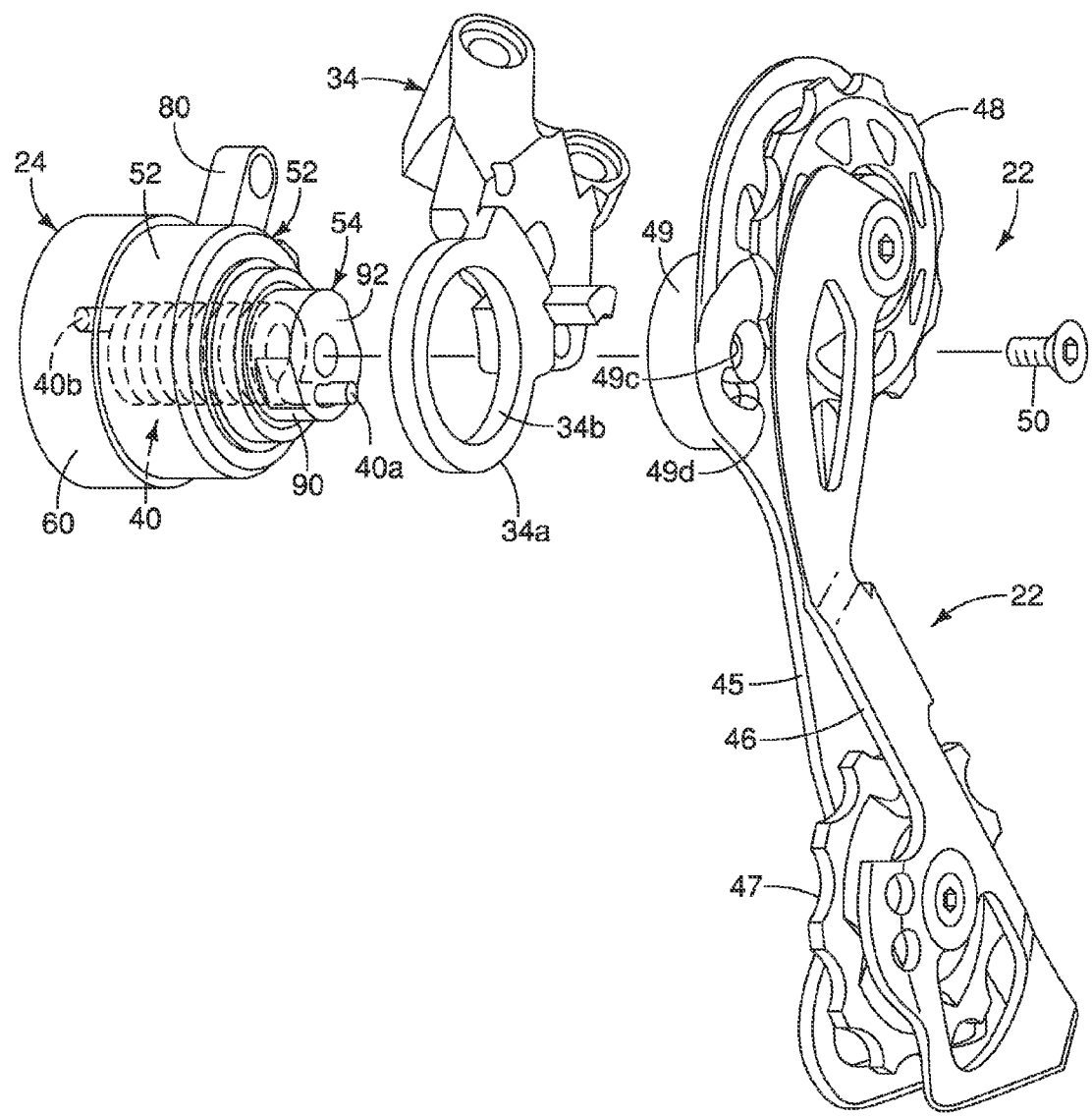
FIG. 4 is a partially exploded perspective view of the movable member, the chain guide and the rotary fluid damper unit illustrated in FIGS. 1 to 3 as viewed from the frame facing side of the rear derailleur.
Figure 6:
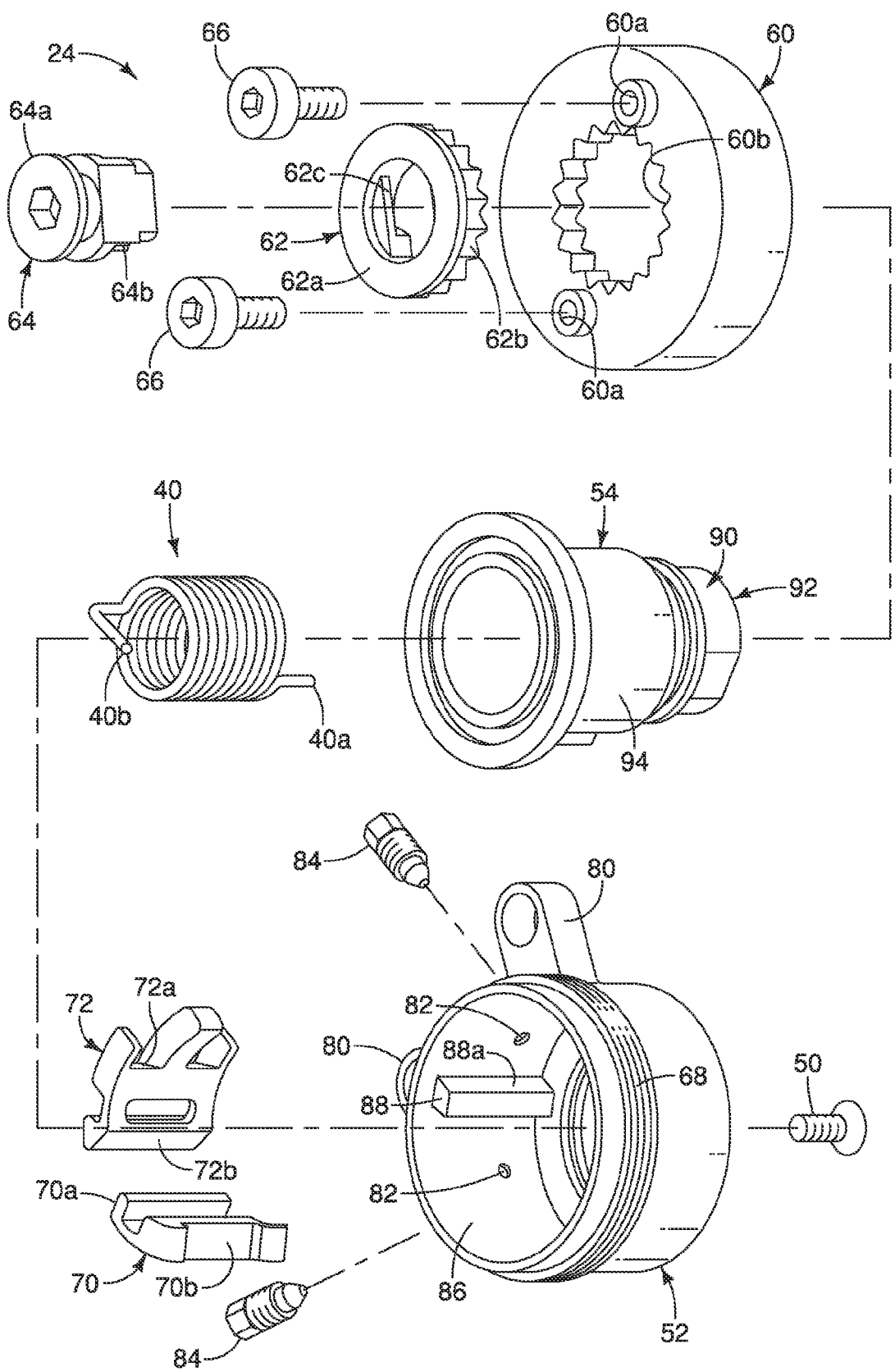
FIG. 6 is an exploded perspective view of the rotary fluid damper unit illustrated in FIGS. 1 to 5 as viewed from the non-frame facing side of the rotary fluid damper unit.

As seen in FIGS. 3, 4 and 6, the bicycle rear derailleur 12 (i.e., a chain tensioning device) further comprises a biasing element 40 that biases the chain guide 22 in a first rotational direction R1 around the rotational axis A with respect to the movable member 34 of the main body 20. As explained later, the rotary fluid damper unit 24 provides a higher degree of rotational resistance in a second rotational direction R2, which is opposite to the first rotational direction R1.

In the first embodiment, as seen in FIG. 1, the moving structure 36 is a linkage that includes a first or outer link 41 and a second or inner link 42. The outer link 41 has a first end pivotally connected to the base member 32, and a second end pivotally connected to the movable member 34. The inner link 42 has a first end pivotally connected to the base member 32, and a second end pivotally connected to the movable member 34. Thus, the outer and inner links 41 and 42 have first ends pivotally connected to the base member 32 and second ends pivotally connected to the movable member 34 to define a four bar linkage arrangement. Here, as seen in FIG. 1, the inner link 42 has a cable attachment member or bolt 42a for attaching an inner wire 18a of the cable 18 to the inner link 42.

The moving structure 36 further includes a biasing member 44 that is interposed between the outer and inner links 41 and 42 to bias the movable member 34 towards one of a low shift stage position and a top shift stage position. In the first embodiment, the biasing member 44 is a coil tension spring that biases the movable member 34 towards the top shift stage position. As used herein, the term "top shift stage (gear) position" refers to the rear derailleur 12 being in an operating position that corresponds to the chain 14 being guided onto one of the rear sprockets 16 with the smallest number of teeth. As used herein, the term "low shift stage (gear) position" refers to the rear derailleur 12 being in an operating position that corresponds to the chain being guided onto one of the rear sprockets 16 with the largest number of teeth.

As seen in FIGS. 1 to 6, the chain guide 22 basically includes a first or outer chain cage plate 45, a second or inner chain cage plate 46, a first or tension pulley 47 and a second or guide pulley 48. The chain guide 22 includes at least one pulley (i.e., the first or tension pulley 47 so that the rear derailleur 12 functions as a chain tensioning device. The chain cage plates 45 and 46 define a chain receiving slot for receiving the chain 14. The pulleys 47 and 48 are both rotatably disposed between the chain cage plates 45 and 46. Here, the guide pulley 48 has its rotational axis offset from the rotational axis A of the chain guide 22. However, it will be apparent that from this disclosure that the rotational axis of the guide pulley 48 can be coincident with the rotational axis A of the chain guide 22.

Figure 5:
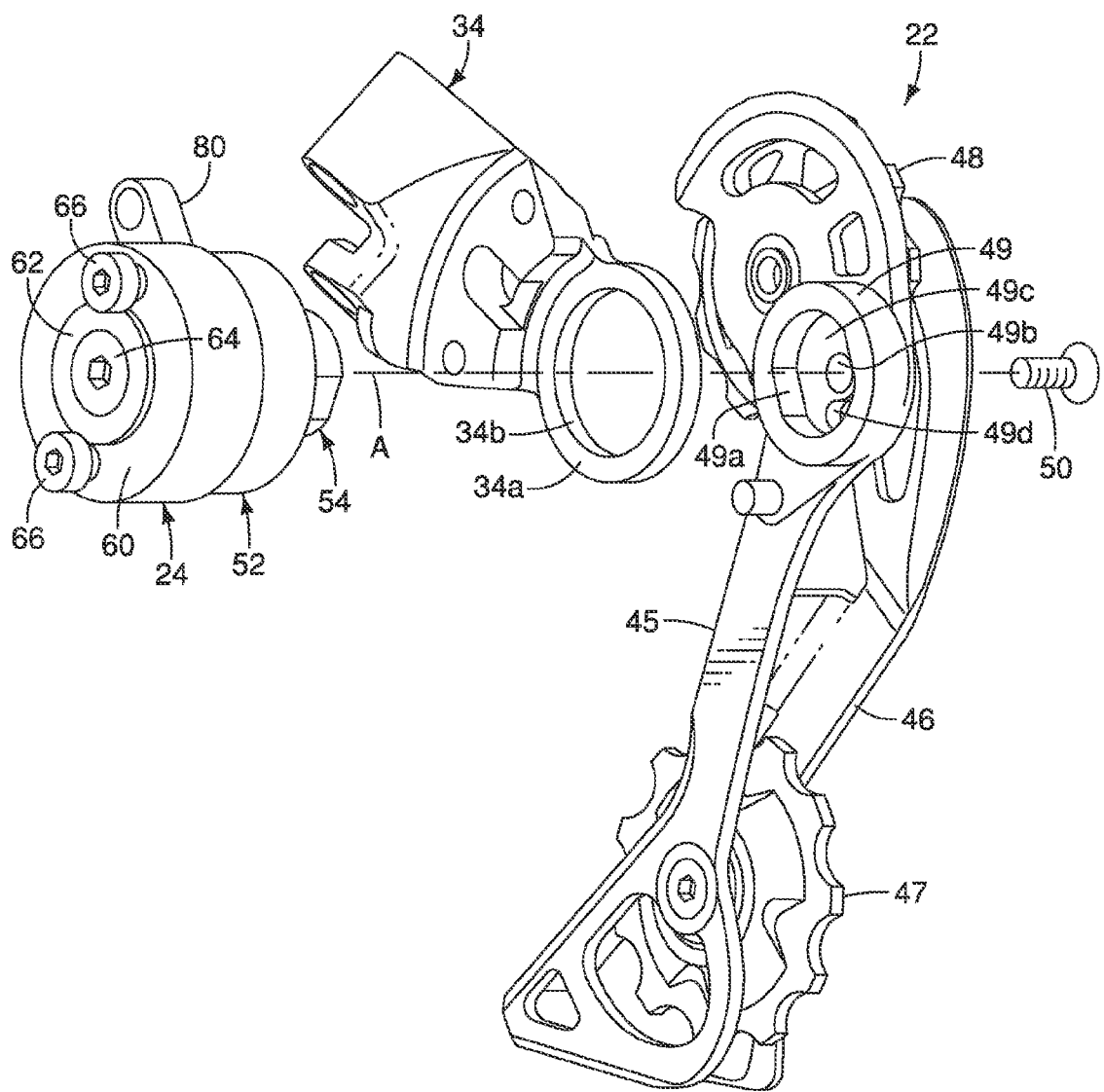
FIG. 5 is a partially exploded perspective view of the movable member, the chain guide and the rotary fluid damper unit illustrated in FIGS. 1 to 4 as viewed from the non-frame facing side of the rotary fluid damper unit.

As explained below, the chain guide 22 is fixed to a portion of the rotary fluid damper unit 24 by a fastener 50 as seen in FIG. 3. The fastener 50 is preferably threaded fastener such as a screw. The chain guide 22 is also provided with an anti-rotation structure that mates with a portion of the rotary fluid damper unit 24. In the first embodiment, as seen in FIG. 5, the outer chain cage plate 45 includes an attachment portion 49 which is coupled to the rotary fluid damper unit 24. The attachment portion 49 includes a recess 49a that has anon-circular cross section with respect to the rotational axis A. The recess 49a constitutes the anti-rotation structure of the chain guide 22. The recess 49a is a blind bore with an opening 49b in an end wall 49c. The fastener 50 passes through the opening 49b to fixedly secure a portion of the rotary fluid damper unit 24 to the outer chain cage plate 45 of the chain guide 22 in a non-rotatably manner. As seen in FIG. 3, the chain guide 22 also has an opening 49d for receiving the first end 40a of the biasing element 40, which biases chain guide 22 in the first rotational direction R1.

Now, the rotary fluid damper unit 24 will be discussed in more detail with reference mainly to FIGS. 3 to 10. The rotary fluid damper unit 24 basically includes an outer member 52 that is fixed to the main body 20 and an inner member 54 that is fixed to the chain guide 22. The inner member 54 is rotatably disposed inside of the outer member 52 to define a fluid cavity 56 that is filled with a fluid 58. In the first embodiment, the rotary fluid damper unit 24 further includes a cover member 60, a spring phase adjustment element 62 and a spring engagement element 64. The spring phase adjustment element 62 and the spring engagement element 64 are coupled together as a unit, which are attached as a unit to the cover member 60 by a pair of fasteners 66 (e.g., screws).

Figure 8:
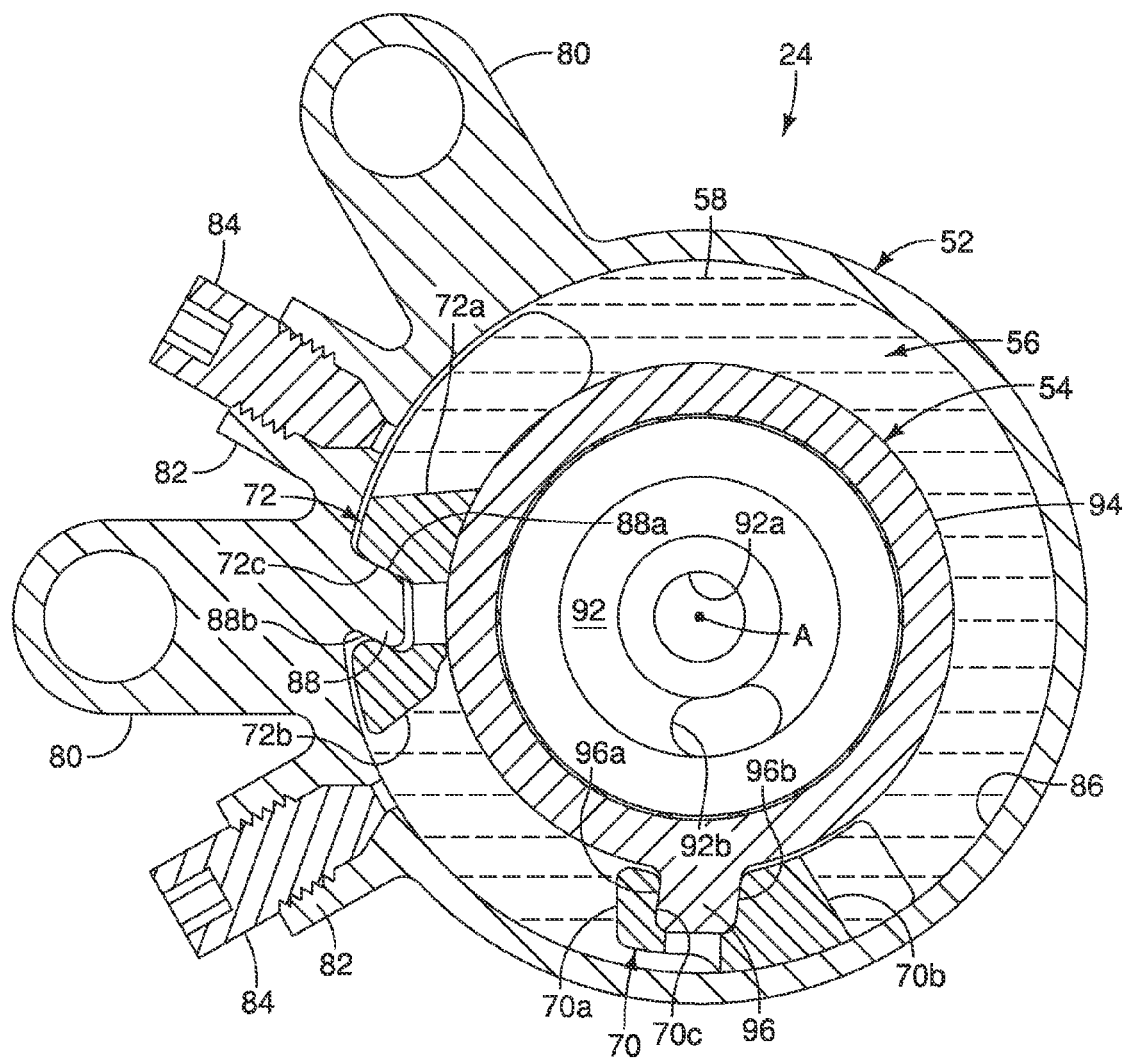
FIG. 8 is a transverse cross sectional view of the rotary fluid damper unit illustrated in FIGS. 1 to 7 as viewed along a section line that perpendicular to the rotational axis of the chain guide in which the chain guide is not moving relative to the movable member and the outer member of the rotary fluid damper unit.
Figure 9:
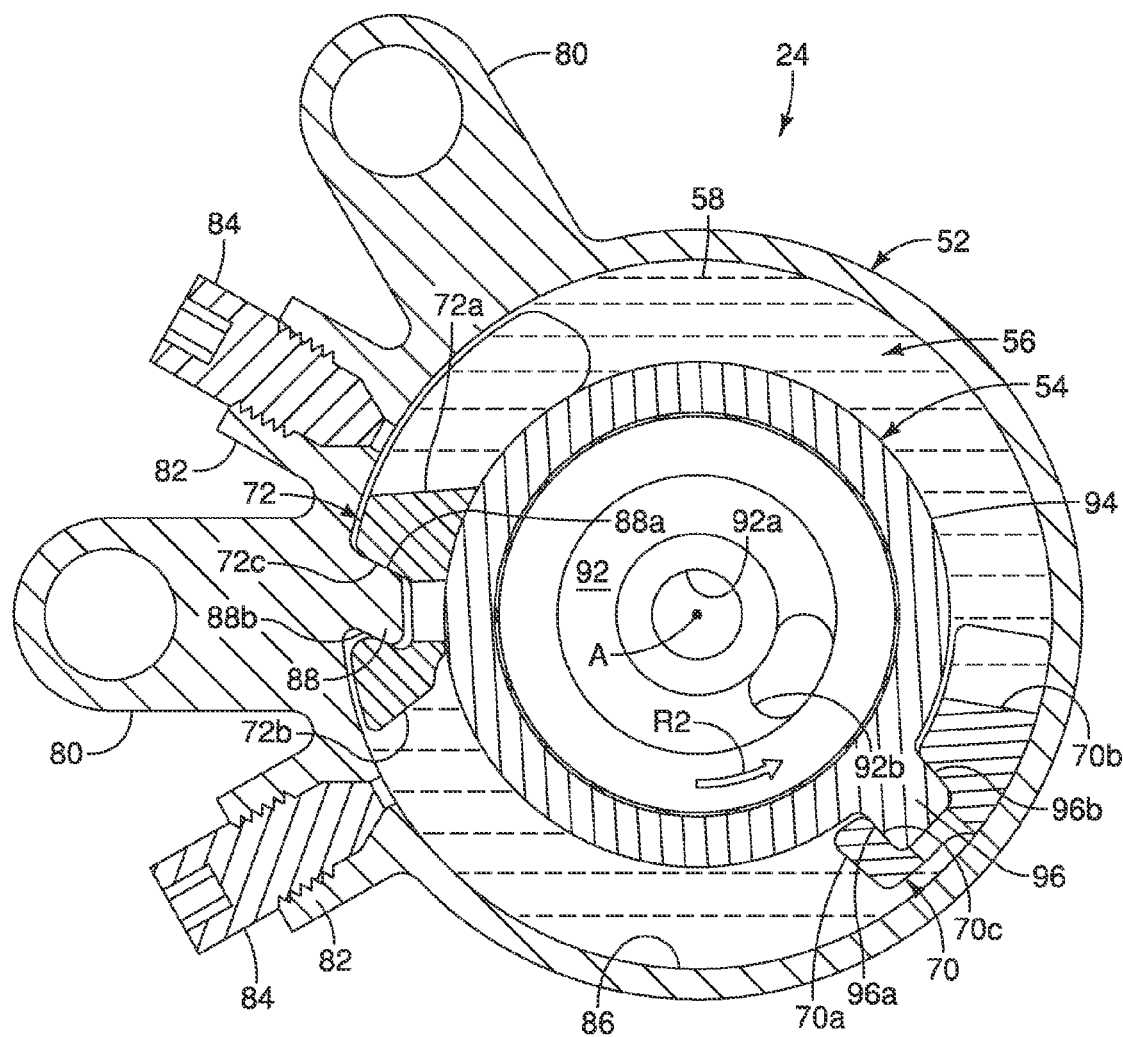
FIG. 9 is a transverse cross sectional view, similar to FIG. 8, of the rotary fluid damper unit, but with the inner member of the rotary fluid damper unit rotating in a counter-clockwise direction with respect to the movable member and the outer member of the rotary fluid damper unit from the position shown in FIG. 8.
Figure 10:
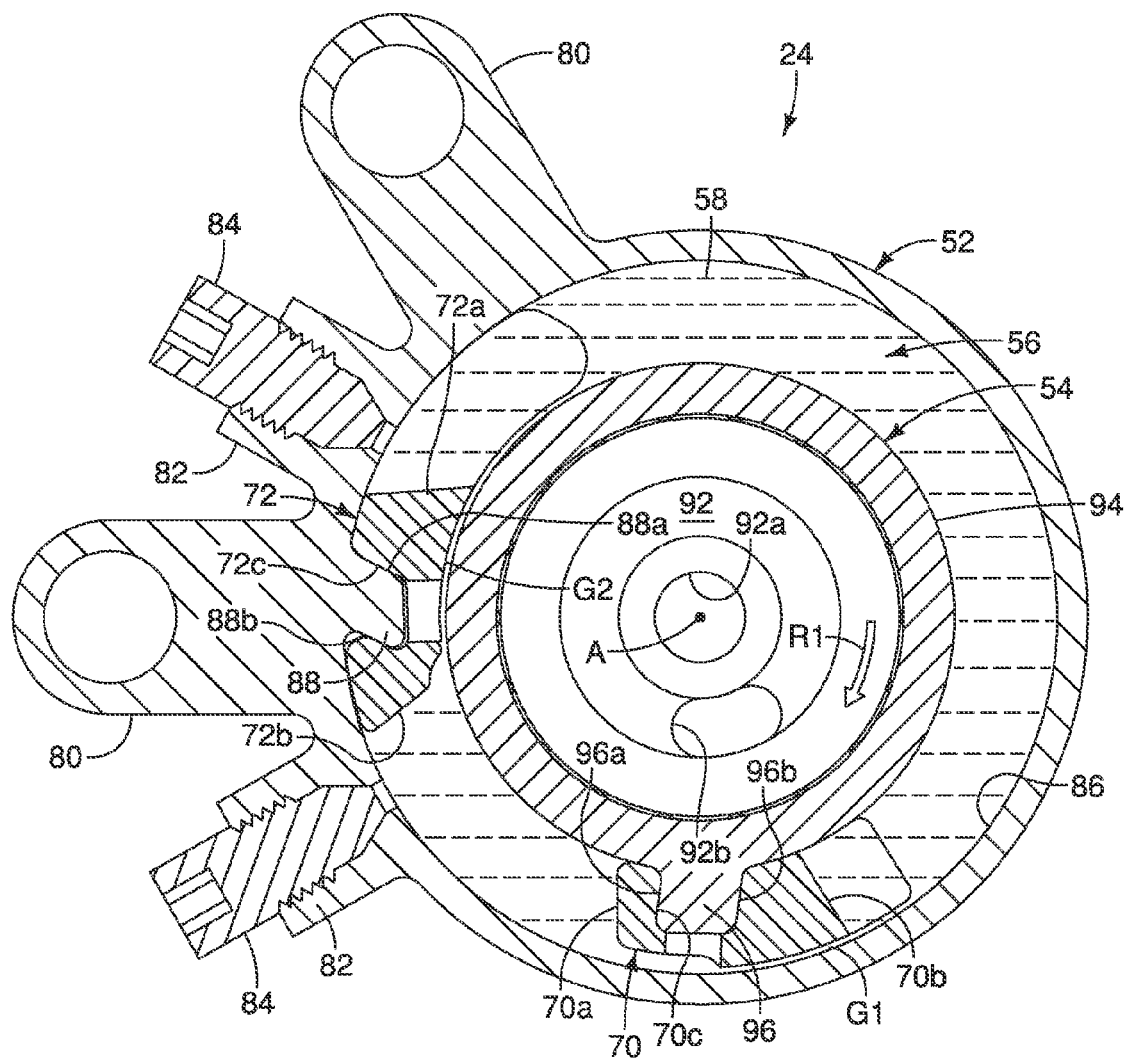
FIG. 10 is a transverse cross sectional view, similar to FIG. 8, of the rotary fluid damper unit, but with the inner member of the rotary fluid damper unit rotating in a clockwise direction with respect to the movable member and the outer member of the rotary fluid damper unit from the position shown in FIG. 9.

As seen in FIGS. 8 to 10, generally, the bicycle rear derailleur 12 (i.e., a chain tensioning device) further comprises at least one fluid flow limiting valve that is configured to form a flow path between the at least one fluid flow limiting valve and one of the outer member 52 and the inner member 54. The at least one fluid flow limiting valve is configured to move radially as the inner member 54 rotates relative to the outer member 52 about the rotational axis A. The at least one fluid flow limiting valve includes a first slanted surface facing in a first circumferential direction and a second slanted surface facing in a second circumferential direction, which is opposite to the first circumferential direction with respect to the rotational axis A.

In particular, as seen in FIGS. 8 to 10, the first embodiment, the at least one fluid flow limiting valve preferably includes a first fluid flow limiting valve 70 and a second fluid flow limiting valve 72. The first fluid flow limiting valve 70 is configured to form a first flow path G1 (FIG. 10) between the first fluid flow limiting valve 70 and-the outer member 52. The second fluid flow limiting valve 72 that is configured to make a second flow path G2 (FIG. 10) between the second fluid flow limiting valve 72 and the inner member 54. The fluid flow limiting valves 70 and 72 effectively divide the fluid cavity 56 into two chambers. As the inner member 54 rotates one of the chambers becomes smaller while the other chamber becomes larger. This rotation of the inner member 54 relative to the outer member 52 forces the fluid 58 to flow from one chamber to the other chamber through either both of the first and second flow paths G1 and G2, or one of the first and second flow paths G1 and G2. The size, shape and other characteristics of the first and second flow paths G1 and G2 limit the flow of the fluid 58 from one chamber to another, thereby limiting the rotational speed of the inner member 54 relative to the outer member 52.

The characteristics of both the fluid 58 and the flow paths G1 and G2 determine how quickly the fluid 58 flows between the chambers and consequently how quickly the chain guide 22 may move and adjust chain tension. For example, for any given fluid, a larger flow path will allow for quicker fluid flow than a smaller flow path, allowing for quicker rotation of the chain guide 22. Likewise, for any given flow path configuration, a less viscous fluid will flow more quickly through the flow path than a more viscous fluid, allowing for quicker rotation of the guide 22. Other fluid characteristics such as compressibility, and flow path characteristics such as shape, may affect fluid flow rates and consequently the performance characteristics of the rotary fluid damper unit 24. Accordingly, the damping characteristics of the rotary fluid damper unit 24 can, for example, be initially set by designing the first and second flow paths G1 and G2 with prescribed sizes and/or shapes and selecting a fluid viscosity to obtain the desired damping characteristics.

The first fluid flow limiting valve 70 includes a first slanted surface 70a facing in a first circumferential direction and a second slanted surface 70b facing in a second circumferential direction, which is opposite to the first circumferential direction with respect to the rotational axis A. The first fluid flow limiting valve 70 also includes a recess 70c for movably mounting the first fluid flow limiting valve 70 on the inner member 54 as discussed below. The first fluid flow limiting valve 70 moves radially response rotating of the inner member 54. In particular, the first slanted surface 70a of the first fluid flow limiting valve 70 is arranged to be forced radially inward by the fluid in the cavity as the inner member 54 rotates relative to the outer member 52 about the rotational axis A in the first rotational direction R1. The second slanted surface 70b of the first fluid flow limiting valve 70 is arranged to be forced radially outward by the fluid in the cavity as the inner member 54 rotates relative to the outer member 52 about the rotational axis A in the second rotational direction R2, which is opposite to the first rotational direction R1.

Similarly, the second fluid flow limiting valve 72 includes a first slanted surface 72a facing in a first circumferential direction and a second slanted surface 72b facing in a second circumferential direction, which is opposite to the first circumferential direction with respect to the rotational axis A. The second fluid flow limiting valve 72 also includes a recess 72c for movably mounting the second fluid flow limiting valve 72 on the outer member 52 as discussed below. The second fluid flow limiting valve 72 moves radially in response rotating of the inner member 54. In particular, the first slanted surface 72a of the second fluid flow limiting valve 72 is arranged to be forced radially inward by the fluid in the cavity as the inner member 54 rotates relative to the outer member 52 about the rotational axis A in the second rotational direction R2. The second slanted surface 72b of the second fluid flow limiting valve 72 is arranged to be forced radially outward by the fluid in the cavity as the inner member 54 rotates relative to the outer member 52 about the rotational axis A in the first rotational direction R1.

In other words, when the inner member 54 rotates in the direction R1 (FIG. 10), the first slanted surface 70a moves the first fluid flow limiting valve 70 inward, while the second slanted surface 72b moves the second fluid flow limiting valve 72 outward. In this case of FIG. 10, the second fluid flow limiting valve 72 creates the second flow path G2, while the first fluid flow limiting valve 70 creates the first flow path G1. On the other hand, when the inner member 54 rotates in the direction R2 (FIG. 9), the second slanted surface 70b moves the first fluid flow limiting valve 70 outward, while the first slanted surface 72a moves the second fluid flow limiting valve 72 inward. In this case of FIG. 9, the first and second fluid flow limiting valves 70 and 72 acts substantially as barriers. However, even if the first and second fluid flow limiting valves 70 and 72 acts substantially as barriers, there are slight gaps between the first fluid flow limiting valve 70 and the outer member 52 as well as between the first fluid flow limiting valve 72 and the inner member 54 so that the inner member 54 can be rotate in the second direction R2.

Still referring to FIGS. 5, 6, 8 to 10, the outer member 52 is a rigid member that is made of a suitable material such as a lightweight metal or a reinforced plastic. The outer member 52 has an external thread 68 (FIG. 6) for threadedly receiving the cover member 60, which has a mating internal thread. The outer member 52 has a pair of mounting flanges or members 80. Each of the mounting flanges 80 has a non-threaded hole for receiving one of the fasteners 30. In this way, the outer member 52 is rigidly fixed to the movable member 34. In the mounted position, the damper support portion 34a of the movable member 34 is disposed between the outer member 52 and the chain guide 22 with respect to the axis direction of the rotational axis A.

The outer member 52 also has a pair of bleed valve ports 82. Each of the bleed valve ports 82 has a bleed valve 84 threadedly attached to the bleed valve ports 82 of the outer member 52 for adding fluid and/or bleeding air from the fluid cavity 56. Thus, preferably, the rotary fluid damper unit 24 includes at least one fluid bleed valve. The outer member 52 has a cylindrical inner surface 86 that defines an outer periphery of the fluid cavity 56. The cylindrical inner surface 86 has a flange or projection 88 that projects inward towards the inner member 54. Here, the projection 88 is an axially extending rib that slidably receives the second fluid flow limiting valve 72.

The projection 88 includes a first slanted surface 88a facing in a first circumferential direction and a second slanted surface 88b facing in a second circumferential direction, which is opposite to the first circumferential direction with respect to the rotational axis A. The first slanted surface 88a is slanted in opposite to the first slanted surface 72a of the second valve 72 with respect to radial direction of the rotary fluid dumper unit 24 to easily move the second valve 72 in an inward direction when the inner member 54 rotates in first rotational direction R1. The second slanted surface 88b is slanted in opposite to the second slanted surface 72b of the second valve 72 with respect to radial direction of the rotary fluid dumper unit 24 to easily move the second valve 72 in an outward direction when the inner member 54 rotates in the second rotational direction R2. The second valve 72 contacts to the first and second slanted surface 88a and 88b of the projection 88.

The second fluid flow limiting valve 72 and the projection 88 functions substantially as a barrier while the inner member 54 rotates relative to the outer member 52 about the rotational axis A in the second rotational direction R2 as seen in FIG. 9. However, the second fluid flow limiting valve 72 forms the second flow path G2 between the second fluid flow limiting valve 72 and the inner member 54 as seen in FIG. 10 as the inner member 54 rotates relative to the outer member 52 about the rotational axis A rotates in the first rotational direction R1.

Still referring to FIGS. 6 and 8 to 10, the inner member 54 is a rigid member that is made of a suitable material such as a lightweight metal or a reinforced plastic. The inner member 54 includes an anti-rotation portion 90 that extends outside of the outer member 52 in an axis direction of the rotational axis A. The inner member 54 extends through the opening 34b in the movable member 34 of the main body 20. The anti-rotation portion 90 has a non-circular peripheral surface that mates with the recess 49a of the outer chain cage plate 45 such that the inner member 54 is non-rotatably fixed to the outer chain cage plate 45. The chain guide 22 is coupled to the portion 90 of the inner member 54. In the mounted position, the inner member 54 extends through the opening 34b of the main body 20 with the portion 90 non-rotatably disposed in the recess 49a of the outer chain cage plate 45. The attachment portion 49 of the outer chain cage plate 45 extends inside of the opening 34b of the main body 20. The opening 34b of the main body 20 has a circular shape. An outer diameter of the attachment portion 49 of the outer chain cage plate 45 is slightly smaller than a diameter of opening 34b of the main body 20.

The inner member 54 has an end wall 92 with a threaded hole 92a for threadedly receiving the fastener 50 to fix the outer chain cage plate 45 to the inner member 54. The end wall 92 also has an opening 92b in which the first end 40a of the biasing element 40 pass through so that the first end 40a of the biasing element 40 engages the opening 49d in the outer chain cage plate 45 of the chain guide 22. As a result, the inner member 54 constitutes a pivot shaft of the chain guide 22 that pivotally supports the chain guide 22 on the movable member 34 of the main body 20.

The inner member 54 further includes a cylindrical outer surface 94 that defines an inner periphery of the fluid cavity 56 (FIGS. 8 to 10). The cylindrical outer surface 94 has a flange or projection 96 that projects outward towards the outer member 52. Here, the projection 96 is an axially extending rib that slidably receives the first fluid flow limiting valve 70. The projection 96 includes a first slanted surface 96a facing in a first circumferential direction and a second slanted surface 96b facing in a second circumferential direction, which is opposite to the first circumferential direction with respect to the rotational axis A. The first slanted surface 96a is slanted in opposite to the first slanted surface 70a of the first valve 70 with respect to radial direction of the rotary fluid dumper unit 24 to easily move the first valve 70 in an inward direction when the inner member 54 rotates in the first rotational direction R1. The second slanted surface 96b is slanted in opposite to the second slanted surface 70b of the first valve 70 with respect to radial direction of the rotary fluid dumper unit 24 to easily move the first valve 70 in an outward direction when the inner member 54 rotates in second rotational direction R2. The first valve 70 contacts to the first and second slanted surface 96a and 96b of the projection 96.

The first fluid flow limiting valve 70 and the projection 96 functions substantially as a barrier while the inner member 54 rotates relative to the outer member 52 about the rotational axis A in the second rotational direction R2 as seen in FIG. 9. However, the first fluid flow valve 70 forms the first flow path G1 between the first fluid flow limiting valve 70 and the outer member 52 as seen in FIG. 10 as the inner member 54 rotates relative to the outer member 52 about the rotational axis A rotates in the first rotational direction R1.

As can be understood from FIGS. 5 and 6, the spring phase adjustment element 62 and the spring engagement element 64 are attached to the cover member 60 by the fasteners 66. In particular, the cover member 60 is provided with a pair of threaded holes 60a for theadedly receiving the fasteners 66. The heads of the fasteners 66 engage a flange 62a of the spring phase adjustment element 62 to prevent relative axial movement of the spring phase adjustment element 62 with respect to the cover member 60. The cover member 60 also has a non-circular opening 60b for receiving and engaging a non-circular portion 62b of the spring phase adjustment element 62. The non-circular portion 62b of the spring phase adjustment element 62 mates with the non-circular opening 60b of the cover member 60 to prevent relative rotational movement.

The spring engagement element 64 includes a tool operating portion 64a and a spring engagement portion 64b. The spring engagement portion 64b has a slot that receives the second end 40b of the biasing element 40 to operatively connect the second end 40b of the biasing element 40 to the movable member 34 of the main body 20. In particular, the spring engagement element 64 is attached to the spring phase adjustment element 62 by a bayonet type of connection. In other words, the spring engagement portion 64b of the spring engagement element 64 is inserted into a non-circular opening 62c of the spring phase adjustment element 62, and then the spring engagement portion 64b is twisted in the counter-clockwise direction, as viewed from the non-frame facing side of the cover member 60, in order to lock the spring engagement element 64 to the spring phase adjustment element 62. The second end 40b of the biasing element 40 also applies a biasing force on the spring engagement element 64 in the counter-clockwise direction, as viewed from the non-frame facing side of the cover member 60, in order to maintain the spring engagement element 64 in the locked position.

Figure 7:
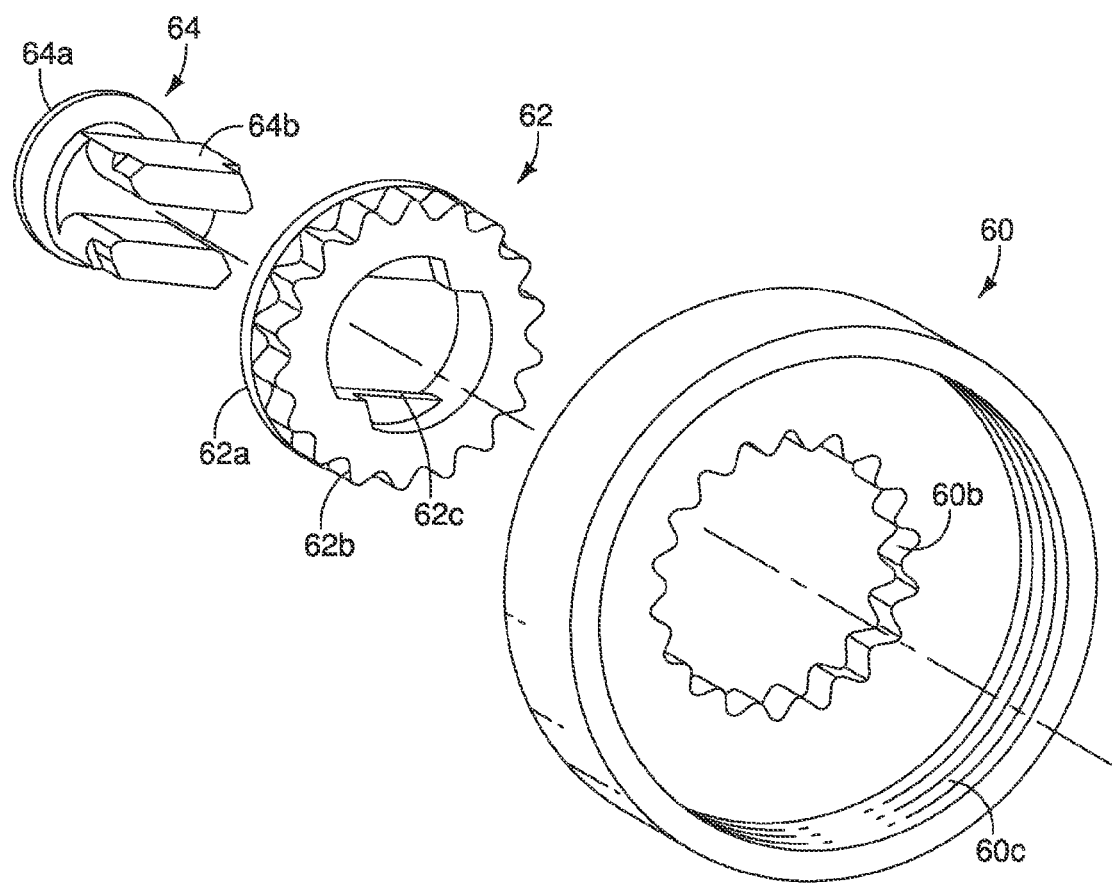
FIG. 7 is an exploded perspective view of selected parts of the rotary fluid damper unit illustrated in FIGS. 1 to 6 as viewed from the frame facing side of the rotary fluid damper unit.

As seen in FIG. 7, the cover member 60 has an internal thread 60c. The internal thread 60c of the cover member 60 threadedly engages the external thread 68 of the outer member 52 (FIG. 6) for securing the cover member 60 to the outer member 52 this way, the second end 40b of the biasing element 40 is operatively connected to the outer member 52 and thus, the movable member 34.

The biasing force of the biasing element 40 can be adjusted by changing the relative position of the spring phase adjustment element 62 with respect to the cover member 60. In particular, the non-circular portion 62b of the spring phase adjustment element 62 mates with the non-circular opening 60b of the cover member 60 in a plurality of different angular positions. To change the angular position of the spring phase adjustment element 62 with respect to the cover member 60, the fasteners 66 are loosened so that the non-circular portion 62b of the spring phase adjustment element 62 moves axially out of the non-circular opening 60b of the cover member 60. Then, the spring phase adjustment element 62 is rotated relative to the cover member 60 so that the spring phase adjustment element 62 is in a different angular position with respect to the cover member 60. Since the spring engagement element 64 is attached to the spring phase adjustment element 62, the spring engagement element 64 is moved to anew angular position along with the second end 40b of the biasing element 40. Finally, the fasteners 66 are tightened to firmly seat the non-circular portion 62b of the spring phase adjustment element 62 in the non-circular opening 60b of the cover member 60. Preferably, the fasteners 66 are configured so that the fasteners 66 remain attached to the cover member 60 while the non-circular portion 62b of the spring phase adjustment element 62 moves axially out of the non-circular opening 60b of the cover member 60 and then rotates relative to the cover member 60 during this adjustment.

Figure 11:
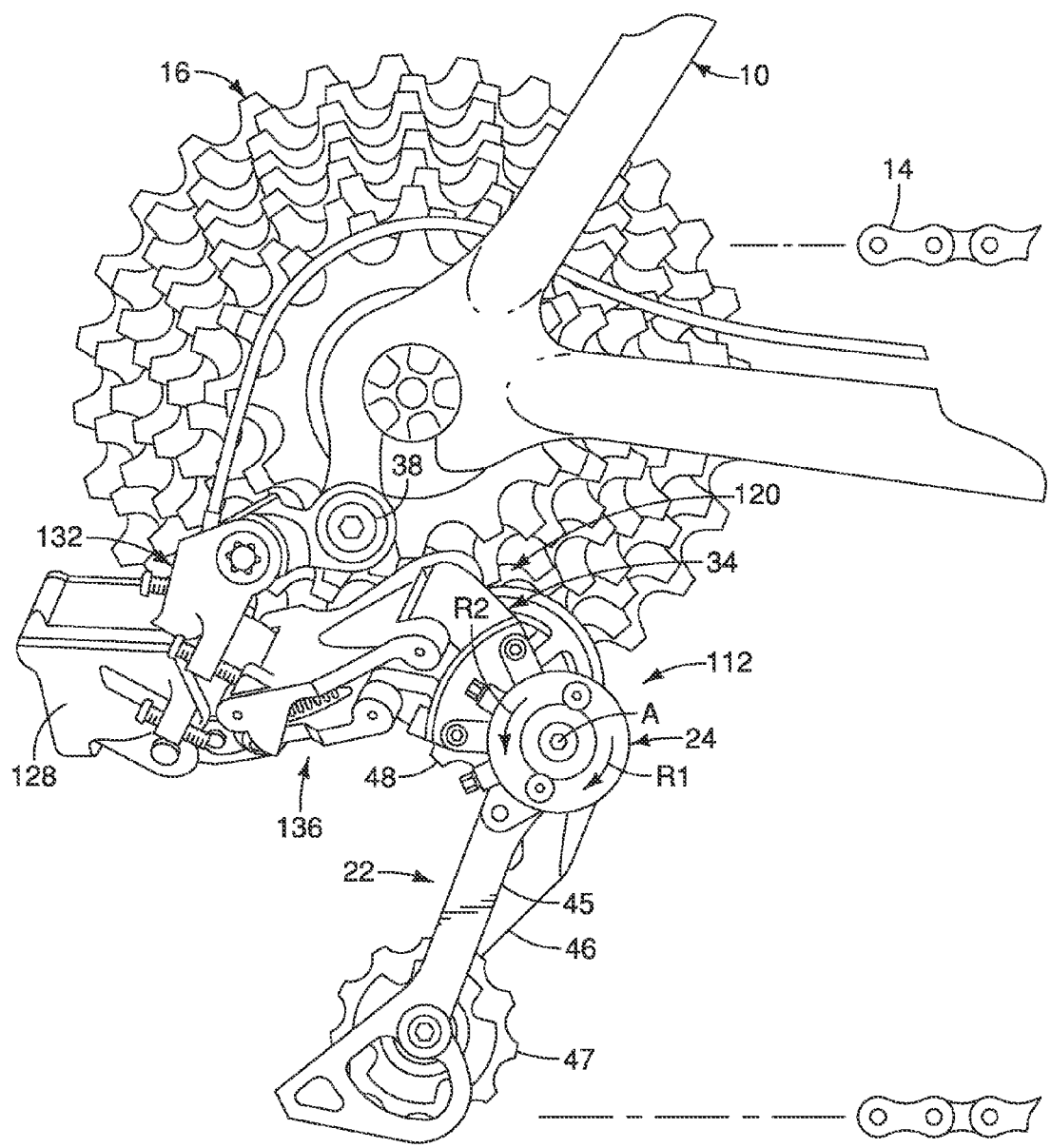
FIG. 11 is a side elevational view of a bicycle rear derailleur (i.e., a chain tensioning device) in accordance with another illustrated embodiment.

As seen in FIG. 11, the rotary fluid damper unit 24 can be used in an electric rear derailleur 112. The electric rear derailleur 112 uses the movable member 34 and the chain guide 22 of the rear derailleur 12. Thus, the parts of the electric rear derailleur 112 that are identical to parts of the rear derailleur 12 will be given the same reference numerals. The electric rear derailleur 112 basically includes a reversible electric motor 128, a main body 120, the chain guide 22 and the rotary fluid damper unit 24. The main body 120 includes a base member 132, the movable member 34 and a moving structure 136. The motor 128 is mounted to the base member 132. The motor 128 has an output shaft that is operatively coupled to the moving structure 136. In the illustrated embodiment of the electric rear derailleur 112, the moving structure 136 includes a pair of links with the output shaft of the motor 128 coupled to one of the links (e.g., the inner link as shown in FIG. 11). Preferably, the moving structure 136 includes a biasing element that biases the links to either the low shift stage (gear) position or the top shift stage (gear) position. Since electric rear derailleurs are known in the bicycle field, the electric rear derailleur 112 will not be discussed and/or illustrated in further detail herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the chain tensioning device. Accordingly, these directional terms, as utilized to describe the chain tensioning device should be interpreted relative to a bicycle in an upright riding position on a horizontal surface and that is equipped with the chain tensioning device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as the changes do not substantially affect their intended function. Components that are shown directly connected or contacting each other can have intermediate structures disposed between them so tong as the changes do not substantially affect their intended function. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A chain tensioning device comprising:
   a main body having a first end and a second end, the first end being configured to be mounted to a bicycle;
   a chain guide including at least one chain cage plate and at least one pulley, the at least one chain cage plate being pivotally coupled to the second end of the main body to rotate around a rotational axis with respect to the main body; and
   a rotary fluid damper unit operatively connected between the main body and the chain guide to provide rotational resistance to the chain guide around the rotational axis, the rotary fluid damper unit including an outer member defining a fluid cavity and an inner member at least a portion of which is rotatably disposed within the fluid cavity of the outer member, one of the outer member and the inner member being detachably mounted on the main body and the other of the outer member and the inner member being non-rotatably coupled to the chain guide, the outer member and the inner member being separate pieces from the main body and the chain guide.

2. The chain tensioning device according to claim 1, wherein
the rotary fluid damper unit is detachably attached to the main body while the chain tensioning device is mounted to the bicycle.

3. The chain tensioning device according to claim 1, wherein
the rotary fluid damper unit is detachably attached to the main body on a non-frame facing side of the main body by at least one fastener.

4. The chain tensioning device according to claim 1, wherein
the outer member is fixed to the main body and the inner member is fixed to the chain guide, the fluid cavity being filled with a fluid.

5. The chain tensioning device according to claim 4, wherein
the inner member includes a portion that extends outside of the outer member in an axis direction of the rotational axis,
the chain guide is coupled to the portion of the inner member.

6. The chain tensioning device according to claim 5, wherein
the main body includes a portion that is disposed between the outer member and the chain guide with respect to the axis direction of the rotational axis.

7. The chain tensioning device according to claim 5, wherein
the main body includes an opening, the inner member extends through the opening of the main body.

8. The chain tensioning device according to claim 1, wherein
the rotary fluid damper unit includes at least one fluid bleed valve.

9. The chain tensioning device according to claim 4, further comprising
at least one fluid flow limiting valve configured to form a flow path between the fluid flow limiting valve and one of the outer member and the inner member.

10. The chain tensioning device according to claim 9, wherein
the at least one fluid flow limiting valve is configured to move radially as the inner member rotates relative to the outer member about the rotational axis.

11. A chain tensioning device comprising:
a main body configured to be mounted to a bicycle;
a chain guide pivotally coupled to the main body to rotate around a rotational axis with respect to the main body;
a rotary fluid damper unit operatively connected between the main body and the chain guide to provide rotational resistance to the chain guide around the rotational axis, the rotary fluid damper unit being a separate unit from the main body, the rotary fluid damper unit including an outer member that is detachably fixed to the main body and an inner member that is detachably fixed to the chain guide, the inner member being rotatably disposed inside of the outer member to define a fluid cavity that is filled with a fluid; and
at least one fluid flow limiting valve configured to form a flow path between the fluid flow limiting valve and one of the outer member and the inner member, the at least one fluid flow limiting valve being configured to move radially as the inner member rotates relative to the outer member about the rotational axis,
the at least one fluid flow limiting valve including a first slanted surface facing in a first circumferential direction and a second slanted surface facing in a second circumferential direction, which is opposite to the first circumferential direction with respect to the rotational axis,
the first slanted surface being arranged to be forced radially inward by the fluid in the cavity as the inner member rotates relative to the outer member about the rotational axis in a first rotational direction, and the second slanted surface being arranged to be forced radially outward by the fluid in the cavity as the inner member rotates relative to the outer member about the rotational axis in a second rotational direction, which is opposite to the first rotational direction.

12. The chain tensioning device according to claim 9, wherein
the at least one fluid flow limiting valve includes a first fluid flow limiting valve that is configured to form a first flow path between the first fluid flow limiting valve and the outer member, and a second fluid flow limiting valve that is configured to form a second flow path between the second fluid flow limiting valve and the inner member.

13. A chain tensioning device comprising:
a main body configured to be mounted to a bicycle;
a chain guide pivotally coupled to the main body to rotate around a rotational axis with respect to the main body;
a rotary fluid damper unit operatively connected between the main body and the chain guide to provide rotational resistance to the chain guide around the rotational axis, the rotary fluid damper unit being a separate unit from the main body, the rotary fluid damper unit including an outer member that is detachably fixed to the main body and an inner member that is detachably fixed to the chain guide, the inner member being rotatably disposed inside of the outer member to define a fluid cavity that is filled with a fluid; and
at least one fluid flow limiting valve configured to form a flow path between the fluid flow limiting valve and one of the outer member and the inner member, the at least one fluid flow limiting valve including a first fluid flow limiting valve and a second fluid flow limiting valve, the first fluid flow limiting valve being configured to form a first flow path between the first fluid flow limiting valve and the outer member, and the second fluid flow limiting valve being configured to form a second flow path between the second fluid flow limiting valve and the inner member,
each of the first and second fluid flow limiting valves including a first slanted surface facing in a first circumferential direction and a second slanted surface facing in a second circumferential direction, which is opposite to the first circumferential direction with respect to the rotational axis,
the first slanted surface of the first fluid flow limiting valve being arranged to be forced radially inward by the fluid in the cavity as the inner member rotates relative to the outer member about the rotational axis in a first rotational direction, and the second slanted surface of the first fluid flow limiting valve being arranged to be forced radially outward by the fluid in the cavity as the inner member rotates relative to the outer member about the rotational axis in a second rotational direction, which is opposite to the first rotational direction, and the first slanted surface of the second fluid flow limiting valve being arranged to be forced radially inward by the fluid in the cavity as the inner member rotates relative to the outer member about the rotational axis in the second rotational direction, and the second slanted surface of the second fluid flow limiting valve being arranged to be forced radially outward by the fluid in the cavity as the inner member rotates relative to the outer member about the rotational axis in the first rotational direction.

14. The chain tensioning device according to claim 12, further comprising a biasing element biasing the chain guide in a first rotational direction around rotational axis with respect to the main body, and the rotary fluid damper unit provides a higher degree of rotational resistance in a second rotational direction, which is opposite to the first rotational direction.

15. The bicycle derailleur according to claim 1, wherein the main body has a base member that includes the first end, a movable member that includes the second end, and a moving structure operatively coupled between the base member and the movable member to move the movable member and the chain guide relative to the base member, the rotary fluid damper unit being disposed on the movable member.

16. The bicycle derailleur according to claim 1, wherein the at least one pulley of the chain guide includes two pulleys, each of the two pulleys being rotatably attached to the at least one chain cage plate about a rotational axis different from the rotational axis of the at least one chain cage plate with respect to the main body.

* * * * *